Jan. 26, 1932.  S. A. REED  1,842,765
ADJUSTABLE PITCH PROPELLER
Original Filed June 18, 1923   3 Sheets-Sheet 1

INVENTOR
Sylvanus A. Reed,
BY
Willis Fowler.
ATTORNEY

Jan. 26, 1932.    S. A. REED    1,842,765
ADJUSTABLE PITCH PROPELLER
Original Filed June 18, 1923    3 Sheets-Sheet 2

INVENTOR
Sylvanus A. Reed,
BY Willis Fowler.
ATTORNEY

Jan. 26, 1932.　　　　　S. A. REED　　　　　1,842,765
ADJUSTABLE PITCH PROPELLER
Original Filed June 18, 1923　　3 Sheets-Sheet 3

INVENTOR
Sylvanus A. Reed.
BY Willis Fowler
ATTORNEY

Patented Jan. 26, 1932

1,842,765

UNITED STATES PATENT OFFICE

SYLVANUS A. REED, OF NEW YORK, N. Y., ASSIGNOR TO THE REED PROPELLER CO., INC., OF NEW YORK, N. Y., A CORPORATION OF NEW YORK

ADJUSTABLE PITCH PROPELLER

Application filed June 18, 1923, Serial No. 646,089. Renewed March 30, 1928.

This invention relates generally to aeronautical propellers and more particularly to the construction of propellers of the adjustable pitch type.

A feature of the invention is the provision of oppositely extending relatively axially adjustable propeller blades having interengaging hooks or flanges on their inner or root ends. The interlocked flanges have the effect of causing the blades to pull against each other in operation thereby doing away with the necessity for employing supplemental heavy attaching parts for securing the blades in position and resisting the tendency of centrifugal action to pull the blades radially from their seats.

Another feature of the invention resides in the means employed for turning the blades about their longitudinal axes to provide the desired change in or reversal of pitch, and includes the use of a set of right and left hand screw members cooperating with opposite marginal portions of the broad inner ends of the blades to exert a powerful but gradual and progressive turning movement that is free from tendency to shock or jar the swiftly rotating parts.

The rotation of the screws to turn the blades is preferably brought about through a friction pulley having a driving connection with the screws and mounted to pass between two arcuate tracker members while traveling in an orbital path of movement. The tracker members are mounted in a convenient location on the fuselage framework and are spaced apart by a distance exceeding the diameter of the friction pulley. Means are provided for moving the tracker members radially to bring one or the other into position to be engaged by the friction pulley for a portion of each orbital revolution to thereby turn the propeller blades about their longitudinal axes to correspondingly alter their pitch.

Still another feature of the invention is the provision of means whereby the tracker members may be manually set to rotate the screw driving pulley in the desired position, the parts being automatically restored to neutral position when the blades have been turned to the predetermined angle selected by the operator.

Other features of the invention will be hereinafter referred to.

In the drawings, in which a preferred embodiment of the invention has been selected for illustration.

Figure 1:
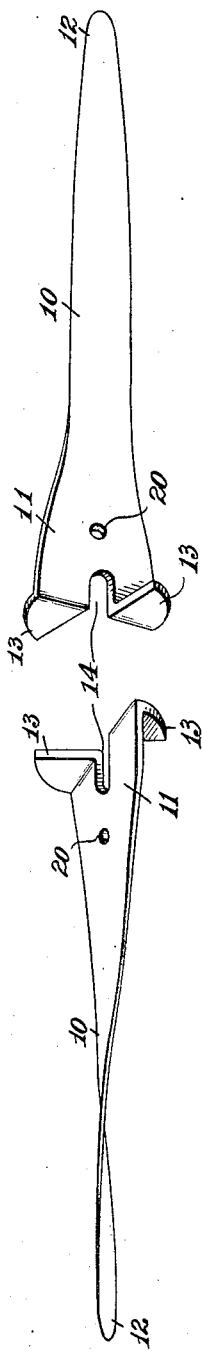
Figure 1 is a view in perspective of the improved propeller and showing the two blade elements in disassembled relation.

Referring to the drawings for a more detailed description of the invention, in Figure 1 is shown a pair of propeller blades 10 of the metal type described in my U. S. Letters Patent No. 1,463,556, granted July 31, 1923, and No. 1,518,410, granted December 9, 1924. Each of the propeller blades consists of a one-piece forging preferably of duralumin or other light-weight metal having a relatively broad and rigid root or inner end 11 and tapering in thickness and width to provide a semi-flexible region at the tip portion or outer end 12.

Figure 2:
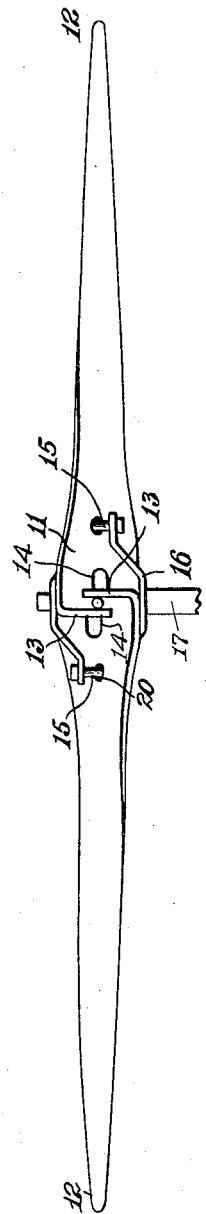
Figure 2 is a view in side elevation of the propeller in assembled condition.

Each of the propeller blades is provided at its inner end with a pair of oppositely extending lateral flange or hook members 13 separated by a slot 14 forming a bifurcation adapted to receive the propeller driving shaft. The disposition of the flange members 13 on the individual propeller blades is clearly shown in Figure 1 of the drawings while the interlocked disposition of the flanges on an assembled propeller is shown in Figure 2. The overlapping engagement of the flanges on the two propeller blades shown in Figure 2 effectively secures the blades against displacement radially under the action of centrifugal force.

In order to permit relative axial adjustment of the blades they are pivoted at points on their axial center lines on the cross bar members 15 of a rectangular framework including a pair of rigid plates 16 spaced apart in spanning relation to the blades and attached at their central portions to the power shaft 17 of the engine. The pivotal connection between the cross bars 15 and the blades consists of a transverse pintle 18 carried by the cross bar and extending in opposite directions in the axial line of the blade and journaled in bearing blocks 19 which are fitted to the edges of openings 20 in the blades and clamped therein through the use of plates 21 rigidly bolted in position therein. While I prefer to have two comparatively light-weight plates 16, extending from the hub for each blade so as to give a support to the cross-bar 15, on both sides of the blade, it is obvious that one of said plates 16, either the inner or outer one, may be dispensed with, and then if it is sufficiently strong and rigid and the bar 15 is rigidly attached thereto, an equally satisfactory transmission of torque and thrust will be effected with a simplification of construction. Therefore I do not confine myself to the double plates 16, but may also use a single plate.

The blade supporting framework referred to includes also a pair of plates or bars 22 attached to and extending transversely of the main plates 16. A pair of screw members 23 and 24 are journaled in the ends of the bars 22 and are provided with sprocket gears 25 and 26 connected by a sprocket chain 27. The screw member 23 is further provided with a friction pulley 28 which can be rotated to correspondingly rotate both of the screw members 23 and 24 in unison.

The screw members 23 and 24 are each provided with two threaded sections 29 and 30 in which the threads are relatively reversed and each threaded section is engaged by a nut 31 having a slot 32 therein engaged by a lug or projection 33 carried by a flange 13 of the propeller blade. The relation and cooperative connection between the screw members and the flanking flanges of the oppositely extending blades is such that the rotation of the screw members turns the flanges and blades in opposite directions about the axial line of the blades and thereby alters the pitch of the blades to the desired extent.

Figure 5:
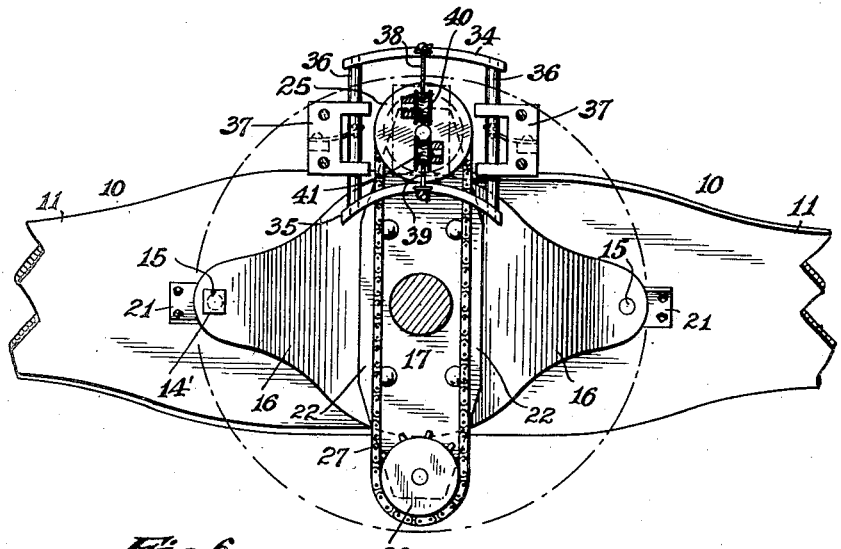
Figure 5 is a view in vertical section taken on the line 5—5 of Figure 3.
Figure 6:
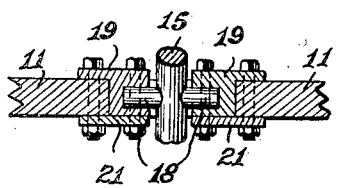
Figure 6 is a sectional view taken on the line 6—6 of Figure 4.
Figure 7:
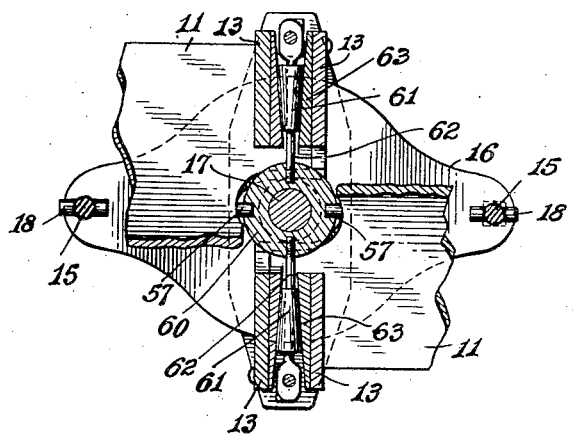
Figure 7 is a sectional view taken on the line 7—7 of Figure 4.

The means for rotating the friction wheel includes a pair of arcuate tracker members 34 and 35 mounted on opposite ends of the spacer rolls 36 and spaced apart from each other by a distance exceeding the diameter of the friction wheel 28. The tracker members 34 and 35 are adapted to be adjusted radially by longitudinal sliding movement of the rods 36 in supporting brackets 37 mounted on the framework of the fuselage 65 and it will be seen that radially outward movement of the tracker members positions the inner member 35 so that the friction wheel 28, which is carried about in an orbital path of movement by the propeller structure, will engage the upper or convex surface of the tracker member 35 as in Figure 5 of the drawings. On the other hand a radially inward movement of the tracker member structure will cause the lower or convex surface of the tracker member 34 to engage the periphery of the friction wheel 28 in its passage. It will be seen that the friction wheel will be turned in opposite directions by its engagement with the respective tracker members and that in this way the direction of rotation of the screw members and consequently of the propeller blades about their longitudinal axes can be controlled.

In order to move the tracker members to operate the blade adjusting mechanism tensile members 38 and 39 are connected to the tracker members 34 and 35 and lead around centrally disposed pulleys 40 and 41 and are connected at the other end to a pair of hand levers 42 and 43 in convenient access to the operator. It will be seen that movement of either hand lever to the left in Figure 3 of the drawings will correspondingly lower or raise the tracker member device to cause the rotation of the friction wheel 28 in the desired direction. A leaf spring device 44 is provided for engagement with laterally projecting pins 45 on the lower extremities of the hand levers to automatically swing the hand levers to neutral positions in which neither tracker member is in position to be engaged by the friction wheel 28 in its passage.

Figure 3:
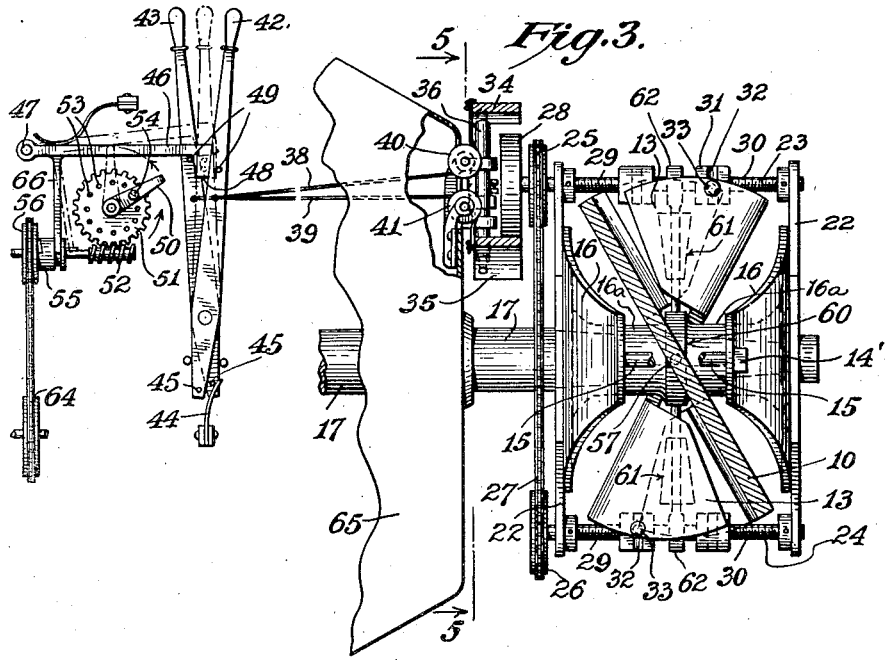
Figure 3 is a view partly in side elevation and partly in vertical section and on an enlarged scale of the means employed for adjusting the propeller blades.
Figure 4:
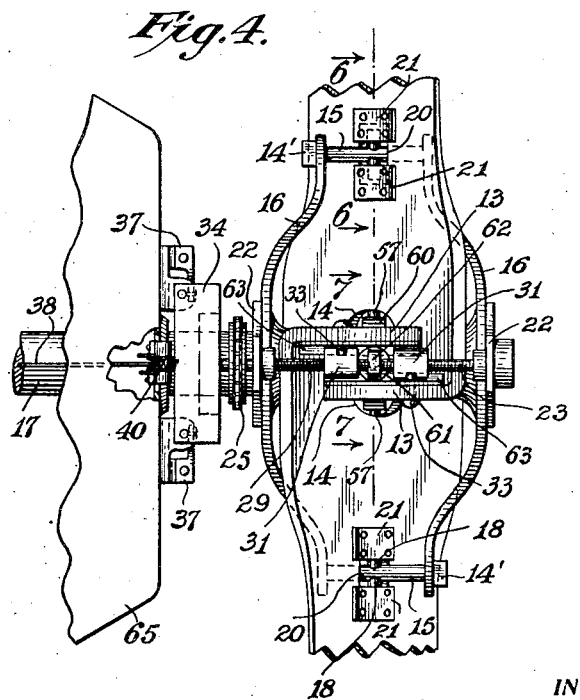
Figure 4 is a plan view of the construction shown in Figure 3.

In order to determine in advance the precise degree of variation in pitch to be given the propeller blades a control member 46 is provided which is pivoted at 47 and has a stop lug 48 adapted to engage a pin 49 on either hand lever 42 or 43 and hold the lever in the left-hand position, as indicated in Figure 3, until released. The control member 46 is arranged to be lifted out of holding engagement with either lever by the lifting engagement therewith of an arm 50 carried by a gear 51 driven by a worm 52. The gear 51 is provided with a series of holes 53 and a pin 54 carried by the arm 50 can be located in one of the holes 53 to thereby determine the point in the rotation of the gear 51 when it is necessary to lift the control member 46 and bring about movement of the tracker members to neutral position to stop further change in the angular position or pitch of the blades. It will be clear that the angular distance separating the holes 53 in the gear 51 will be known so that coordination between the position of the arm and the desired pitch of the blades can be readily effected.

The worm 52 is driven by belts, chains, or countershafts by the airplane motor itself and there accordingly exists a fixed rotary relation with the varying speed of the motor. For this reason the determination of the angle of pitch change by selection of the hole in which the pin is to be inserted is wholly independent of the rate of speed of rotation of the motor. By previous calculation the amount of pitch change corresponding to each hole may be determined and said pitch change suitably marked opposite each hole.

In order to more fully explain the operation of the pitch changing apparatus let us suppose that the airplane pilot while flying wishes to increase what is ordinarily known as the pitch of his propeller from five feet to seven feet. This requires a change in blade deflection of approximately two degrees. The pilot places pin 54 in that one of the holes 53 bearing the mark 2° and throws the lever 42 forward until it is caught and held by the stop lug 48 and does nothing more. The pitch of the blades is thereupon immediately changed to seven feet and remains locked at that position. The pilot then, at his convenience, moves the pin back to the zero hole restoring the arm 50 and the worm gear to neutral.

The calculation which determines or calibrates the position assigned to the hole marked 2° on the dial of gear 54 will be, for example as follows: The pitch of screws 23 and 24 is such that it requires say three rotations to change the angles of blades 10 two degrees so that the friction wheel 28 must make three revolutions. The peripheral length of the friction face of the tracker members is such that the engaged friction wheel 28 is turned one half a revolution at each contact so that six contacts of the wheel and tracker member must be made to rotate the screw 23 three times, hence the tracker member must remain in engaging position during six rotations of the motor shaft. The ratio of rotation of the clutch sprocket 64 to the engine shaft is such that gear 51 turns say ten degrees for each rotation of the engine, then for three such rotations it will turn thirty degrees and the corresponding dial point will be marked for two degrees pitch change and also, if desired, for the equivalent pitch change corresponding to two degrees.

Means are provided for stopping the rotation of the gear simultaneously with the lifting of the control member stop lug 48 out of engagement with either pin 49. The means disclosed in Figure 3 of the drawings include a clutch 55 between a constantly driven sprocket 56 and the shaft of the worm 52. A downwardly extending arm 66 carried by the control member 46 engages one member of the clutch 55 and moves it to the right out of cooperation with its co-operating member when the control member is raised, as will be clear.

The turning movement of the propeller blades about their longitudinal axes is further controlled and directed by a second point of pivotal mounting of each blade which consists of a pin 57 projecting inwardly from the bottom of each slot 14 in the axial line of the blade and journaled in a collar or enlargement 60 on the hub.

In order to obviate the substantial friction that would result from actual contact of the interhooked flange members 13 with each other, roller members 61 are mounted between the opposed surfaces of the flanges. The rollers 61 have necessarily a conical formation as will be seen and are mounted for rotation on supporting rods 62 extending between the screw members and the enlargement 60 on the hub. Preferably wedge-shaped facing plates 63 are attached to the confronting surfaces of the flanges to provide bearing surfaces corresponding to the contour of the rollers. The roller bearing means may, however, be omitted and the flanges 13, 13, may bear directly against each other with flat faces. This is preferable when operated only as a ground-controlled adjustable pitch propeller.

It will be seen that the propeller adjusting device described is relatively simple and that it takes full advantage of the broad root end construction, compared to various stem-like roots, of the propeller blades that forms a characteristic feature of applicant's improved propeller as described and claimed in the Letters Patent hereinabove referred to. By this arrangement a strong and rigid construction is obtained having greater simplicity and much less weight than devices for the same general purpose heretofore known and used.

It is obvious that if the entire mechanism beyond the parts 25, 26, 27 and 28, is omitted it is no longer possible for the pilot to control and change the propeller pitch from his seat and when in flight, but it is still possible to change and adjust the pitch at will while the propeller is at rest and the airplane not in flight. This can be done by turning 28 in one direction or the other by hand until the blade is brought to the desired angle and then locking the mechanism by any well known means, such as a wire clinch, so that it will not change during flight. This results in a ground-controlled in contradistinction to a flight-controlled adjustable pitch propeller.

What I claim is:—

1. In an aeronautical propeller, a pair of oppositely extending blades mounted for angular adjustment about their longitudinal axes, and screw members extending transversely outside of and over the edges of the inner ends of the blades and a traveling-nut engaging each screw-member and said nuts having connections with the blades for producing variations in the angular position thereof.

2. In an aeronautical propeller, a pair of oppositely extending blades having relatively broad bifurcated and overlapping inner ends, said blades being pivotally supported on their longitudinal median lines for angular adjustment thereabout, screw members extending transversely of the inner ends of the blades and in flanking relation thereto, and connections between the screw members and edge portions of the blades for adjusting all blades about their longitudinal median lines.

3. In an aeronautical propeller, a pair of oppositely extending blades having relatively broad bifurcated and overlapping inner ends, said bifurcated ends having laterally extending interhooked flange members, said blades being pivotally supported on their longitudinal median lines for angular adjustment thereabout, screw members extending transversely of the inner ends of the blades and in flanking relation thereto, and connections between the screw members and said flange members for adjusting the blades about their longitudinal median lines.

4. The combination of a driving member, an aeronautical propeller having separate oppositely extending blades angularly adjustable on their longitudinal axes, the inner ends of said blades being forked and the said forks spanning the said driving-member, the fork of each blade having its respective end turned or bent in opposite directions and the bent ends of the said blade forks overlapping in a hooked relation with each other and acting to mutually resist the radial pull of centrifugal force, each blade receiving the radial pull exerted upon the other during rotation.

5. In an aeronautical propeller, a pair of oppositely extending blades having relatively broad bifurcated and overlapping innner ends spanning the propeller drive shaft, a framework enclosing the inner ends of the blades and including frame members passing through the blades on the median lines thereof, pivotal connections between the blades said frame members and the hub whereby the blades may be angularly adjusted about their median lines, and reversely threaded screw members mounted in said framework and having operating connections with edge portions of the blades for adjusting the same.

6. In an aeronautical propeller, a pair of oppositely extending blades having relatively broad bifurcated and overlapping inner ends spanning the propeller drive shaft, a framework enclosing the inner ends of the blades and including frame members passing through the blades on the median lines thereof, pivotal connections between the blades said frame members and the propeller shaft whereby the blades may be angularly adjusted about their median lines, operatively connected screw members mounted in said framework and having operating connections with the blades for adjusting the same, a friction wheel carried by one of said screw members, and a tracker member arranged to be moved into position to be engaged by the friction wheel to thereby rotate said screw members and adjust the blades.

7. In an aeronautical propeller, a pair of oppositely extending blades having relatively broad inner ends provided with interhooked flanges, a framework enclosing the inner ends of the blades and rotatable therewith, pivotal connections between the blades and said framework whereby the blades may be angularly adjusted about their median lines, operatively connected screw members mounted in said framework and having operating connections with said flanges for adjusting the blades, a friction wheel carried by one of said screw members, a tracker member mounted on the fuselage framework, means for manually moving the tracker member into position to be engaged by the friction wheel in its orbital movement, and means for automatically withdrawing the tracker member from wheel engaging position after a predetermined extent of operation.

8. In an aeronautical propeller, a pair of oppositely extending blades having relatively board bifurcated and overlapping inner ends provided with interhooked flanges, a framework enclosing the inner ends of the blades and rotatable therewith, pivotal connections between the blades and said framework whereby the blades may be angularly adjusted about their median lines, operatively connected screw members mounted in said framework and having operating connections with said flanges for adjusting the blades, a friction wheel carried by one of said screw members, a pair of spaced apart tracker members between which the friction wheel passes in its orbital movement, means for manually moving the tracker members so that one or the other will be engaged by the friction wheel to rotate the screws in one or the other direction, and means for automatically withdrawing the tracker members to neutral position after a predetermined extent of operation.

9. In an aeronautical propeller, a pair of oppositely extending blades having relatively broad bifurcated and overlapping inner ends, said bifurcated ends being provided with opposite laterally extending flanges occupying a mutually overlapped position, said blades being pivotally mounted for angular adjustment about their longitudinal axes, and means controlled from the operator's seat for varying the extent of overlap of the flanges to thereby vary the angular adjustment of the blades.

10. In an aeronautical propeller, separate blades rotatable about their longitudinal axes for change of pitch, said blades being operatively and movably interhooked at their root portions, and means for rotating said blades about their longitudinal axes to vary the pitch.

11. In an aeronautical propeller, separate blades having overlapping inner ends provided with laterally extending interhooked flange members, said blades being pivotally mounted on their longitudinal median lines for angular adjustment thereabout, and means for altering the angular adjustment of each blade on its longitudinal axis.

12. In an aeronautical propeller, separate blades having relatively broad bifurcated and overlapping inner ends, said bifurcated ends having laterally extending interhooked flange members, said blades being pivotally supported on their longitudinal median lines for angular adjustment thereabout, and means for adjusting said blades angularly.

13. In an aeronautical propeller, separate blades having overlapping inner ends provided with opposite surfaces and capable of being adjusted angularly on their longitudinal axes, said surfaces being conical and conical rollers interposed between said opposite surfaces.

14. In an aeronautical propeller, separate blades having forked inner ends spanning the driving-member and provided with means for sustaining the greater part of the centrifugal stresses, said blades being displaceable around their longitudinal axes, rigid members extending from the driving-member, pivoted means in said axis connecting said rigid extensions with its blade at a point on said blade-axis having a radius which is a substantial fraction of the blade-radius, said pivoting means supporting the greater part of the torque and thrust stresses.

15. In an aeronautical propeller, separate blades each adjustable on its longitudinal axis to vary its pitch-angle, said blades having relatively broad inner portions, means for securing the blades against longitudinal displacement, each blade having a pivotal connection at its inner end on its longitudinal axial line with a part moving in fixed relation with the drive-shaft and provided with a transverse opening a substantial distance from its inner end, a member for each blade in fixed relation to the drive-shaft and rotating therewith and having pivotal means between it and said blade disposed in said opening in alinement with said first mentioned pivotal connection.

16. In an aeronautical propeller, separate blades each adjustable on its longitudinal axis to alter its pitch angle, means for retaining the blades against longitudinal displacement, a pair of members fixed in relation to the drive-shaft for each blade and extending substantially parallel with the axis of the blade one upon each side thereof, each blade being provided with a transverse opening distant from its inner end, a bar extending through said opening and secured to said fixed members and serving to transmit the driving power from the drive-shaft to said blade.

17. In an aeronautical propeller, separate blades each adjustable on its longitudinal axis to change its pitch-angle, means for holding the blades against longitudinal displacement, a pair of members fixed in relation to the drive shaft for each blade and projecting one along each side of the blade, each blade having a transverse opening therein a substantial distance from its inner end, a bar extending through said blade-opening and secured to the pair of members, each blade being pivoted on its longitudinal axial line both at its inner end to a part fixed in relation to the drive-shaft and in said blade-opening to said bar.

18. In an aeronautical propeller, a pair of oppositely extending blades having forked inner ends and mounted for angular adjustment on their longitudinal axes, said forked ends of the blades spanning the driving means and overlapping each other, screw members extending transversely of the edges of the inner ends of the blades, and a traveling nut engaging each screw member and said nuts having connections with the blades for producing variations in the angular positions thereof.

19. In an aeronautical propeller, variable pitch blades having their inner ends forked with the prongs thereof in overlapping relation, a hub spanned by said blade forks and the blades pivotally connected with the hub for angular adjustment, screw-members extending transversely of the inner ends of said blades, adjusting connections between said screw members and blade forks for simultaneously adjusting said blades angularly on their longitudinal axes.

20. In an aeronautical propeller, variable pitch blades having bifurcated overlapping inner ends, a hub with which the inner end of each blade is pivotally associated, blade supporting means fixedly related to said hub and pivotally connected with each blade at a substantial distance from said hub and said means being disposed exteriorly of said blades, adjusting screw-members extending transversely of the inner ends of said blades, and connections between the said blades and screw members for adjusting the blades angularly on their longitudinal axes.

21. In an aeronautical propeller, variable pitch blades having overlapping inner ends, said blades being pivotally supported on their longitudinal median lines and provided with projections overlapping each other, adjusting screw-members disposed between said blade projections and extending transversely of the inner ends of said blades, and connections between said screw-members and projections for adjusting said blades angularly on their longitudinal axes.

22. In an aeronautical propeller, variable pitch blades having forked overlapping inner ends, the fork-prongs of each blade being disposed laterally in opposite directions so as to over lay each other upon the same side of the blade, adjusting screw-members disposed between said oppositely projecting parts, one upon each face of said blades, said blades being pivotally supported on their longitudinal median lines for angular adjustment thereabout, and connections between said screw-members and said projecting parts for adjusting said blades angularly on their longitudinal axes.

23. In an aeronautical propeller, variable pitch blades having forked overlapping inner ends and mounted for angular adjustment on their longitudinal axes, the fork prongs of each blade having oppositely arranged lateral extensions or projections overlapping each other, rotatable screw-members having reverse threads at their opposite ends and a nut traveling on each threaded end and operatively connected with said respective overlapping projections of the fork-prongs, for adjusting the blades angularly on their longitudinal axes.

24. In an aeronautical propeller, separate blades rotatable about their longitudinal axes for change of pitch, said blades being directly inter-engaged at their root portions, and means for rotating said blades about their longitudinal axes to vary the pitch.

In testimony whereof, I have hereunto set my hand.

SYLVANUS A. REED.